(12) United States Patent
Chatterji et al.

(10) Patent No.: US 6,840,319 B1
(45) Date of Patent: Jan. 11, 2005

(54) METHODS, COMPOSITIONS AND BIODEGRADABLE FLUID LOSS CONTROL ADDITIVES FOR CEMENTING SUBTERRANEAN ZONES

(75) Inventors: Jiten Chatterji, Duncan, OK (US); Roger S. Cromwell, Walters, OK (US); Bobby J. King, Duncan, OK (US); D. Chad Brenneis, Marlow, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/761,538

(22) Filed: Jan. 21, 2004

(51) Int. Cl.$^7$ .................... E21B 33/14; E21B 33/138
(52) U.S. Cl. .................... 166/293; 166/283; 106/725
(58) Field of Search ................ 166/293, 294, 166/285, 283, 282, 281; 106/725, 696, 707

(56) References Cited

U.S. PATENT DOCUMENTS

| | | |
|---|---|---|
| 3,132,693 A | 5/1964 | Weisend ............... 166/33 |
| 3,359,225 A | 12/1967 | Weisend .............. 260/29.6 |
| 4,515,635 A | 5/1985 | Rao et al. ............. 106/90 |
| 4,554,081 A | 11/1985 | Borchardt et al. ..... 252/8.5 A |
| 4,555,269 A | 11/1985 | Rao et al. ............. 106/90 |
| 4,557,763 A | 12/1985 | George et al. ......... 106/90 |
| 4,640,942 A | 2/1987 | Brothers ............... 523/130 |
| 4,674,574 A | 6/1987 | Savoly et al. ........ 166/293 |
| 4,676,317 A | 6/1987 | Fry et al. ............. 166/293 |
| 4,687,516 A | 8/1987 | Burkhalter et al. ..... 106/90 |
| 4,700,780 A | 10/1987 | Brothers .............. 166/293 |
| 4,703,801 A | 11/1987 | Fry et al. ............. 166/293 |
| 4,742,094 A | 5/1988 | Brothers et al. ...... 523/130 |
| 4,791,989 A | 12/1988 | Brothers et al. ...... 166/293 |
| 4,806,164 A | 2/1989 | Brothers .............. 106/90 |
| 4,818,288 A | 4/1989 | Aignesberger et al. ... 106/90 |
| 5,151,131 A | 9/1992 | Burkhalter et al. .... 106/822 |
| 5,191,931 A | 3/1993 | Himes et al. .......... 166/282 |
| 5,290,869 A | 3/1994 | Kinoshita et al. ..... 525/291 |
| 5,340,860 A | 8/1994 | Brake et al. .......... 524/166 |
| 5,368,642 A | 11/1994 | Rodrigues et al. ..... 106/727 |
| 5,389,706 A | 2/1995 | Heathman et al. ....... 524/5 |
| 5,439,057 A | 8/1995 | Weaver et al. ........ 166/295 |
| 5,680,900 A | 10/1997 | Nguyen et al. ........ 166/295 |
| 5,908,885 A | 6/1999 | Sikes et al. .......... 524/5 |
| 6,019,835 A | 2/2000 | Chatterji et al. ...... 106/725 |
| 6,133,347 A | 10/2000 | Vickers, Jr. et al. ... 524/8 |
| 6,136,950 A | 10/2000 | Vickers, Jr. et al. ... 528/363 |
| 6,182,758 B1 | 2/2001 | Vijn .................. 166/293 |
| 6,268,406 B1 | 7/2001 | Chatterji et al. ...... 523/130 |
| 6,284,867 B1 | 9/2001 | Vickers, Jr. et al. ... 528/363 |
| 6,310,143 B1 | 10/2001 | Vickers, Jr. et al. ... 525/327.6 |
| 6,405,801 B1 | 6/2002 | Vijn et al. ........... 166/293 |
| 6,419,016 B1 | 7/2002 | Reddy ................. 166/293 |
| 6,429,266 B2 | 8/2002 | Vickers, Jr. et al. ... 525/420 |
| 6,451,881 B1 | 9/2002 | Vickers, Jr. et al. ... 524/8 |
| 6,454,004 B2 | 9/2002 | Reddy et al. ......... 166/293 |
| 6,591,910 B1 | 7/2003 | Chatterji et al. ...... 166/293 |
| 6,626,992 B2 | 9/2003 | Vijn et al. ........... 106/726 |
| 6,630,021 B2 | 10/2003 | Reddy et al. ......... 106/809 |
| 6,716,911 B2 * | 4/2004 | Doi et al. ............ 524/801 |
| 2002/0013422 A1 | 1/2002 | Vickers, Jr. et al. ... 525/420 |

FOREIGN PATENT DOCUMENTS

| | | | |
|---|---|---|---|
| DE | 103 14 354.8 | 3/2003 | |
| WO | WO 00/00536 | 1/2001 | ........... C08G/81/00 |

OTHER PUBLICATIONS

Halliburton brochure entitled "CFR–3 Cement Friction Reducer Dispersant" dated 1998.
Halliburton brochure entitled "Halad–9 Fluid–Loss Additive" dated 1999.
Halliburton brochure entitled "Halad®–23 Fluid–Loss Additive" dated 2000.
Halliburton brochure entitled "Halad®–344 Fluid–Loss Additive" dated 1998.
Halliburton brochure entitled "Halad®–413 Fluid–Loss Additive" dated 1998.
Halliburton brochure entitled "Halad®–14 Fluid–Loss Additive" dated 1999.
Halliburton brochure entitled "Halad®–22A Fluid–Loss Additive" dated 1998.
Halliburton brochure entitled "Halad®–322 Fluid–Loss Additive" dated 1999.
Halliburton brochure entitled "Halad®–447 Fluid–Loss Additive" dated 1999.
Halliburton brochure entitled "Halad®–600 E+ Fluid Loss Additive" Dated 1999.
Halliburton brochure entitled "Halad–700® Fluid–Loss Additive" dated 1999.
Halliburton brochure entitled Fluid–Loss Additives Our Case for Halliburton Additives is Water Tight. Dated 1994.
Patent Application entitled "Methods of Cementing In Subterranean Zones Penetrated By Well Bores Using Biodegradable Dispersants", filed May 16, 2003, U.S. Appl. No. 10/439,491, by Jiten Chatterji et al.

* cited by examiner

*Primary Examiner*—Frank Tsay
(74) *Attorney, Agent, or Firm*—Craig W. Roddy; McAfee & Taft

(57) ABSTRACT

Methods, compositions and fluid loss control additives for cementing in subterranean zones are disclosed. A composition comprises a hydraulic cement, sufficient water to from a slurry and a water soluble biodegradable fluid loss control additive comprising a mixture of a condensation product and hydroxyethylcellulose having a molar substitution in the range of from about 1 mole to about 2.5 moles of ethylene oxide.

65 Claims, No Drawings

METHODS, COMPOSITIONS AND BIODEGRADABLE FLUID LOSS CONTROL ADDITIVES FOR CEMENTING SUBTERRANEAN ZONES

BACKGROUND OF THE INVENTION

1. Field of the Invention

The present invention relates to improved methods, compositions and fluid loss control additives for cementing subterranean zones penetrated by well bores.

2. Description of the Prior Art

Subterranean zones penetrated by well bores are commonly sealed by hydraulic cement compositions. For example, hydraulic cement compositions are used in primary cementing operations whereby strings of pipe such as casing and liners are cemented in well bores. In performing primary cementing, a hydraulic cement composition is pumped into the annular space between walls of a well bore and the exterior surfaces of a pipe string disposed therein. The cement composition is permitted to set in the annular space thereby forming an annual sheath of hardened substantially impermeable cement therein which supports and positions the pipe string in the well bore and seals the exterior surfaces of the pipe string to the walls of the well bore. Hydraulic cement compositions are also utilized in a variety of cementing operations such as sealing highly permeable zones or fractures in subterranean zones, plugging cracks or holes in pipe strings and the like.

Fluid loss control additives have been included in hydraulic cement compositions to prevent significant loss of fluid, i.e. water, into the subterranean zone or formation being cemented. In primary cementing, the loss of fluid from the cement composition can result in premature gelation of the cement slurry or bridging of the annular space between the formation and the casing.

While a variety of fluid loss control additives have been utilized in hydraulic cement slurries used in cementing subterranean zones penetrated by well bores, they are not environmentally acceptable, especially in off shore operations in that they do not undergo complete biodegration in the environment and cause damage to aquatic and other life therein. Thus, there are continuing needs for improved biodegradable cement composition fluid loss control additives and improved cement compositions containing such additives.

SUMMARY OF THE INVENTION

The present invention provides improved methods, compositions and biodegradable fluid loss control additives for cementing subterranean zones that meet the needs described above and overcome the deficiencies of the prior art. The methods of the invention for cementing subterranean zones penetrated by a well bore basically comprise the following steps. A cement composition comprising a hydraulic cement, sufficient water to form a slurry and a water soluble biodegradable fluid loss control additive is prepared or provided. The biodegradable fluid loss control additive comprises a mixture of a condensation product and hydroxyethylcellulose having a molar substitution in the range of from about 1 mole to about 2.5 moles of ethylene oxide with a molar substitution of about 1.5 moles being preferred. Examples of the condensation products that can be used include, but are not limited to: water, gelatin, formaldehyde, sodium sulfite and acetone; water, casein, formaldehyde, sodium sulfite acetone; casein, sodium sulfite, acetone, water, formaldehyde and sodium pyrosulfite; water, soy protein, formaldehyde, sodium sulfite and acetone; water, polyaspartic acid, acetaldehyde, sodium sulfite and pyrocatechol; dimethylsulfoxide, gelatin, glyoxal, urea and sodium sulfite; and water, polyaspartic acid, formaldehyde, sodium pyrosulfite, melamine and sodium hydroxide. The cement composition is placed in the subterranean zone to be cemented, and then the cement composition is allowed to set into a solid mass therein.

The well cement compositions of this invention basically comprise a hydraulic cement, sufficient water to form a slurry and a water soluble biodegradable cement fluid loss control additive comprising a mixture of a condensation product as described above and hydroxyethylcellulose having a molar substitution in the range of from about 1 mole to about 2.5 moles of ethylene oxide.

The water soluble biodegradable fluid loss control additives of this invention comprise a mixture of a condensation product as described above and hydroxyethylcellulose having a molar substitution in the range of from about 1 to about 2.5 moles of ethylene oxide.

The objects, features and advantages of the present invention will be readily apparent to those skilled in the art upon a reading of the description of preferred embodiments which follows.

DESCRIPTION OF PREFERRED EMBODIMENTS

The methods of cementing a subterranean zone penetrated by a well bore in accordance with the present invention comprise the following steps. A cement composition is prepared or provided comprising a hydraulic cement, sufficient water to form a slurry and a water soluble biodegradable fluid loss control additive. The cement composition is placed in the subterranean zone to be cemented and the cement composition is then allowed to set into a solid mass therein.

The cement compositions of this invention basically comprise a hydraulic cement, sufficient water to form a slurry, and a water soluble biodegradable fluid loss control additive.

The hydraulic cements that can be utilized in the compositions of this invention include, but are not limited to, Portland cements, slag cements, pozzolana cements, gypsum cements, aluminous cements and silica cements. Of these, Portland cements and their equivalents are generally preferred for use in accordance with this invention.

The water in the cement compositions can be fresh water or salt water. The term "salt water" is used herein to mean unsaturated salt solutions and saturated salt solutions including brines and seawater. The water is present in the cement compositions in amounts sufficient to form a pumpable slurry. Generally, the water is present in an amount in the range of from about 35% to about 65% by weight of hydraulic cement in the compositions.

The water soluble biodegradable fluid loss control additives comprise a mixture of a condensation product and hydroxyethylcellulose having a molar substitution in the range of from about 1 to about 2.5 moles of ethylene oxide, preferably about 1.5 moles.

Examples of the condensation products that can be used and their preparation include, but are not limited to, the following:

(No. 1) The condensation product of water, gelatin, formaldehyde, sodium sulfite and acetone. A preferred such condensation product comprises 43.17% by weight water, 17.27% by weight gelatin, 25.18% by weight formaldehyde, 7.19% by weight sodium sulfite and 7.19% by weight acetone. The condensation product is prepared by dissolving 240 grams of gelatin in 600 grams of water containing 100 grams of sodium sulfite and 100 grams of acetone. Following the addition of 350 grams of a 37% by weight aqueous formaldehyde solution, the mixture is heated to 140° F. The pH of the solution is adjusted to 7 with formic acid and heated for two hours at 176° F. The reaction solution is distilled in a vacuum to remove methanol produced by the competing Canizarro reaction.

(No. 2) The condensation product of water, casein, formaldehyde, sodium sulfite and acetone. A preferred such condensation product comprises 61.05% by weight water, 5.81% by weight casein, 23.26% by weight formaldehyde, 5.08% by weight sodium sulfite and 4.80% by weight acetone. The condensation product is prepared by dissolving 20 grams of casein in 210 grams of water. 17.5 grams of sodium sulfite and 16.5 grams of acetone are added to the casein solution. The solution is heated to 140° F. followed by slow addition of 80 grams of 30% aqueous formaldehyde solution. The solution is stirred for two hours at 158° F. and the pH of the reaction solution is adjusted to 7 with formic acid. The solution is then concentrated to half the original volume by vacuum distillation to remove methanol.

(No. 3) The condensation product of casein, sodium sulfite, acetone, water, formaldehyde and sodium pyrosulfite. A preferred such condensation product comprises 26.90% by weight casein, 7.91% by weight sodium sulfite, 7.91% by weight acetone, 19.77% by weight water, 36.94% by weight formaldehyde and 0.57% by weight pyrosulfite. The condensation product is prepared by dissolving 100 grams of sodium sulfite and 100 grams of acetone in 250 grams of water. The solution is heated to 140° F. Then 467 grams of 30% aqueous formaldehyde solution are added. The reaction solution is stirred for 40 minutes at 158° F. At the end of 40 minutes, 7.26 grams of sodium pyrosulfite are added and the solution is stirred for an additional 30 minutes. The pH of the solution is adjusted to 7.0 with formic acid. The solution is distilled under vacuum to remove methanol. The residual solution is diluted to 6 liters with distilled water and 340 grams of casein. The resulting polymer solution is dried whereby grafting of the backbone takes place.

(No. 4) The condensation product of water, soy protein, formaldehyde, sodium sulfite and acetone. A preferred such condensation product comprises 47.69% by weight water, 7.95% by weight soy protein, 8.27% by weight sodium sulfite, 7.79% by weight acetone, and 28.30% by weight formaldehyde. The condensation product is prepared by adding 100 grams of soy protein to 600 grams of water. The pH of the solution is adjusted to about 13 with sodium hydroxide. To this solution are added 104 grams of sodium sulfite and 98 grams of acetone. The mixture is then heated to 176° F. To the heated solution 356 grams of 30% aqueous formaldehyde solution are added drop wise with vigorous agitation. The pH of the solution is adjusted to 7 with formic acid. Methanol produced by a competing Canizarro reaction is completely distilled off under vacuum to produce the condensation product.

(No. 5) The condensation product of water, polyaspartic acid, acetaldehyde, sodium sulfite and pyrocatechol. A preferred such condensation product comprises 43.94% by weight water, 6.99% by weight polyaspartic acid, 17.96% by weight acetaldehyde, 34.80% by weight sodium sulfite and 36.00% by weight pyrocatechol. The condensation product is prepared by dissolving 15.9 grams of polyaspartic acid in 100 grams of water. The solution is cooled to 35.6° F. To the chilled solution is added 34.8 grams of sodium sulfite and 36 grams of pyrocatechol. Then, 40.9 grams of acetaldehyde is added drop wise taking precaution not to raise the temperature of the solution above 53.6° F. Upon completion of the addition, the temperature is raised to 167° F. and agitated for two hours at that temperature. The solution is cooled to 68° F. and the pH is adjusted to 7 by formic acid. The solution is concentrated to half its volume under vacuum.

(No. 6) The condensation product of dimethylsulfoxide, gelatin, glyoxal, urea, and sodium sulfite. A preferred such condensation product comprises 57.75% by weight dimethylsulfoxide, 20.88% by weight gelatin, 3.62% by weight glyoxal, 8.61% by weight urea, and 17.40% by weight sodium sulfite. The condensation product is prepared by adding 39.77 grams of gelatin to 100 milliliters of dimethyl sulfoxide. To the solution is added 17.4 grams of sodium sulfite and 16.4 grams of urea with stirring. The mixture is heated to 140° F., followed by the addition of 6.9 grams of 40% aqueous glyoxal solution. The reaction mixture is then heated to 167° F. and held at that temperature for two hours. The dimethyl sulfoxide is then removed under reduced pressure.

(No. 7) The condensation product of water, polyaspartic acid, formaldehyde, sodium pyrosulfite, melamine and sodium hydroxide. A preferred such condensation product comprises 39.55% by weight water, 9.88% by weight polyaspartic acid, 21.19% by weight formaldehyde, 7.06% by weight sodium pyrosulfite, 8.90% by weight melamine, and 13.42% by weight sodium hydroxide. The condensation product is prepared by heating 150 grams of 30% aqueous formaldehyde solution to 86° F. Then, 63 grams of melamine and 50 grams of sodium pyrosulfite are added, followed by 95 grams of a 15% solution of sodium hydroxide. To this solution is added 280 grams of water. The pH of the solution is adjusted to 3 with sulfuric acid. 70 grams of a 40% aqueous solution of polyaspartic acid is then added to the solution. The solution is raised to a temperature of 160° F. and held at that temperature for two hours. The reaction solution is concentrated to ⅓ of its original volume with reduced pressure and a temperature of 176° F. The solution is cooled and the pH is adjusted to 7 with sodium hydroxide.

Of the above condensation products, the condensation product (No. 1) comprising water, gelatin, formaldehyde, sodium sulfite and acetone is preferred.

The condensation product comprises from about 70% to about 90% by weight of the water soluble biodegradable fluid loss control additive and the hydroxyethylcellulose having a molar substitution in the range of from about 1 mole to about 2.5 moles of ethylene oxide comprises from about 10% to about 30% by weight thereof. More preferably, the condensation product comprises about 80% by weight of the water soluble biodegradable fluid loss control additive and the hydroxyethylcellulose having a molar substitution in the range of from about 1 mole to about 2.5 moles of ethylene oxide comprises about 20% by weight thereof.

Most preferably, the water soluble biodegradable fluid loss control additive comprises the condensation product of gelatin, acetone, formaldehyde and sodium sulfite in an amount of about 80% by weight of the additive and hydroxyethylcellulose having a molar substitution of about 1.5 moles of ethylene oxide in an amount of about 20% by weight of the additive.

The water soluble biodegradable fluid loss control additive is present in the cement composition in an amount in the range of from about 0.5% to about 2% by weight of cement therein, more preferably in an amount of about 1% by weight of cement therein.

A preferred method of this invention for cementing a subterranean zone penetrated by a well bore comprises the steps of: (a) preparing or providing a cement composition that comprises a hydraulic cement, sufficient water to form a slurry and a water soluble biodegradable fluid loss control additive comprising a mixture of a condensation product and hydroxyethylcellulose having a molar substitution in the range of from about 1 mole to about 2.5 moles of ethylene oxide; (b) placing the cement composition in the subterranean zone to be cemented; and (c) allowing the cement composition to set into a solid mass therein.

A preferred well cement composition of this invention comprises: a hydraulic cement; sufficient water to form a slurry; and a water soluble biodegradable fluid loss control additive comprising a mixture of a condensation product and hydroxyethylcellulose having a molar substitution in the range of from about 1 mole to about 2.5 moles of ethylene oxide.

A preferred water soluble biodegradable fluid loss control additive of this invention comprises a mixture of a condensation product and hydroxyethylcellulose having a molar substitution in the range of from about 1 mole to about 2.5 moles of ethylene oxide.

In order to further illustrate the methods and compositions of this invention, the following examples are given.

Example 1

Two water soluble biodegradable fluid loss control additives of this invention were prepared. The first fluid loss control additive comprised a mixture of the condensation product of gelatin, acetone, formaldehyde and sodium sulfite present in an amount of 90% by weight and hydroxyethylcellulose having a molar substitution of 1.5 moles of ethylene oxide present in an amount of 10% by weight. The second fluid loss control additive comprised a mixture of the condensation product of gelatin, acetone, formaldehyde and sodium sulfite present in an amount of 80% by weight and hydroxyethylcellulose having a molar substitution of 1.5 moles of ethylene oxide present in an amount of 20% by weight. The first and second biodegradable fluid loss control additives of this invention along with a non-biodegradable prior art fluid loss control additive were tested for fluid loss control properties in accordance with the test procedure set forth in the API Specification for Materials and Testing for Well Cements, API Specification 10B, 22$^{nd}$ Edition, dated December, 1997 of the American Petroleum Institute. The non-biodegradable prior art fluid loss control additive was compared to the two fluid loss control additives of this invention. The results of these tests are given in Table I below.

TABLE I

Comparison of Fluid Loss Control Properties

| Fluid Loss Control Additive | Test Temperature | Cement Composition (Class A) | Cement Composition (Class H) | Cement Composition Density (lb/gal) | Salt (by wt. of water) | Fluid Loss (cc/30 min) |
|---|---|---|---|---|---|---|
| Prior Art[1] | 100° F. | A | | 15.6 | — | 224 |
| First Biodegradable[2] | | A | | 15.6 | — | 150 |
| Second Biodegradable[3] | | A | | 15.6 | — | 86 |
| Prior Art | 100° F. | A | | 15.9 | 18 | 199 |
| First Biodegradable | | A | | 15.9 | 18 | 313 |
| Second Biodegradable | | A | | 15.9 | 18 | 188 |
| Prior Art | 100° F. | | H | 16.5 | — | 40 |
| First Biodegradable | | | H | 16.5 | — | 70 |
| Second Biodegradable | | | H | 16.5 | — | 50 |
| Prior Art | 100° F. | | H | 16.76 | 18 | 70 |
| First Biodegradable | | | H | 16.76 | 18 | 144 |
| Second Biodegradable | | | H | 16.76 | 18 | 68 |
| Prior Art | 140° F. | | H | 16.5 | — | 50 |
| Second Biodegradable | | | H | 16.5 | — | 62 |
| Prior Art | 140° F. | | H | 16.5 | 18 | 102 |
| Second Biodegradable | | | H | 16.5 | 18 | 108 |

[1]Condensation product of formaldehyde, acetone and sodium bisulfite (80% by weight) and hydroxyethylcellulose having a molar substitution of 1.5 moles of ethylene oxide (20% by weight). See U.S. Pat. No. 4,557,763 issued to George, et al. on December 10, 1985.
[2]Condensation product of gelatin, acetone, formaldehyde and sodium sulfite (90%) and hydroxyethylcellulose having a molar substitution of 1.5 moles of ethylene oxide (10%).
[3]Condensation product of gelatin, acetone, formaldehyde and sodium sulfite (80%) and hydroxyethylcellulose having a molar substitution of 1.5 moles of ethylene oxide (20%).

From Table I, it can be seen that the non-biodegradable prior art fluid loss control additive and the second biodegradable fluid loss control additive of this invention have comparable fluid loss control properties.

Example 2

The non-biodegradable prior art fluid loss control additive and the second biodegradable fluid loss control additive were combined with cement compositions in an amount 1% by weight of the cement. One of the cement compositions contained fresh water and the other contained fresh water with 18% by weight of salt added thereto. The results of these tests are given in Table II below.

TABLE II

Comparison of Rheological Properties

| Fluid Loss Control Additive | Test Temp. (° F.) | Fann Viscometer Readings (rpm) | | | | | | |
|---|---|---|---|---|---|---|---|---|
| | | 600 | 300 | 200 | 100 | 60 | 30 | 6 | 3 |
| Class H Cement + 1% Fluid Loss Control Agent (16.5 lb/gal.) | | | | | | | | | |
| Prior Art | 80 | 263 | 140 | 95 | 48 | 29 | 14 | 2 | 1 |
| Second Biodegradable | 80 | 270 | 150 | 102 | 52 | 31 | 15 | 2 | 1 |
| Prior Art | 140 | 160 | 90 | 58 | 29 | 17 | 8 | 1 | 0 |
| Second Biodegradable | 140 | 125 | 73 | 42 | 21 | 12 | 6 | 1 | 0 |
| Class H Cement + 1% Fluid Loss Control Agent + 1% Salt (16.76 lb/gal) | | | | | | | | | |
| Prior Art | 100 | 260 | 144 | 101 | 54 | 34 | 18 | 5 | 4 |
| Second Biodegradable | 100 | 272 | 150 | 104 | 55 | 34 | 17 | 3 | 1 |

TABLE II-continued

Comparison of Rheological Properties

| Fluid Loss Control Additive | Test Temp. (° F.) | Fann Viscometer Readings (rpm) | | | | | | | |
|---|---|---|---|---|---|---|---|---|---|
| | | 600 | 300 | 200 | 100 | 60 | 30 | 6 | 3 |
| Prior Art | 140 | 115 | 68 | 43 | 22 | 14 | 7 | 1 | 0 |
| Second Biodegradable | 140 | 130 | 87 | 55 | 28 | 18 | 9 | 1 | 0 |

From Table II, it can be seen that the theological properties of the two fluid loss control additives are comparable irrespective of temperature. In the cement composition containing salt, the theological properties of the two mixtures were similar.

Example 3

The non-biodegradable prior art fluid loss control additive and the second biodegradable fluid loss control additive of this invention were added to cement compositions and the compositions were tested for thickening time. The results of these tests are given in Table III below.

TABLE III

Comparison of Thickening Times

Class H Cement + 1% Fluid Loss Control Agent + 38% Water

| Fluid Loss Control Additive | Temperature (° F.) | Density (lb/gal) | Salt (% by weight of water) | Thickening Time (hr:min) |
|---|---|---|---|---|
| Prior Art | 100 | 16.5 | — | 11:15 |
| Second Biodegradable | 100 | 16.5 | — | 10:22 |
| Prior Art | 140 | 16.5 | — | 6:04 |
| Second Biodegradable | 140 | 16.5 | — | 5:54 |
| Prior Art | 140 | 16.76 | 18 | 7:03 |
| Second Biodegradable | 140 | 16.76 | 18 | 7:26 |

From Table III, it can be seen that the thickening times of the fluid loss control additives at 100° F. and 140° F. were comparable.

Example 4

The non-biodegradable prior art fluid loss control additive and the second biodegradable fluid loss control additive of this invention were added to cement compositions and the cement compositions were cured at 140° F. for 24 hours and 72 hours and were then tested for compressive strength.

TABLE IV

Comparison of 140° F. Compressive Strengths

| Fluid Loss Control Additive | Class H Cement + 1% Fluid Loss Control Agent (16.5 lb/gal) Compressive Strength (psi) | |
|---|---|---|
| | 24 Hr. | 72 Hr. |
| Prior Art | 4250 | 5940 |
| Second Biodegradable | 3300 | 5920 |

From Table IV, it can be seen that the cement composition containing the non-biodegradable prior art fluid loss control additive and the biodegradable fluid loss control additive have similar compressive strengths.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of cementing in a subterranean zone comprising:
   preparing or providing a cement composition that comprises a hydraulic cement, sufficient water to form a slurry and a water soluble biodegradable fluid loss control additive comprising a mixture of a condensation product and hydroxyethylcellulose having a molar substitution in the range of from about 1 mole to about 2.5 moles of ethylene oxide;
   placing the cement composition in the subterranean zone to be cemented; and
   allowing the cement composition to set therein.

2. The method of claim 1 wherein the hydraulic cement in the cement composition is selected from the group consisting of Portland cements, slag cements, pozzolana cements, gypsum cements, aluminous cements and silica cements.

3. The method of claim 1 wherein the hydraulic cement in the cement composition is Portland cement.

4. The method of claim 1 wherein the water in the cement composition is selected from the group consisting of fresh water and salt water.

5. The method of claim 1 wherein the water is present in the cement composition in an amount in the range of from about 35% to about 65% by weight of cement therein.

6. The method of claim 1 wherein the condensation product is selected from the group consisting of the condensation product of water, gelatin, formaldehyde, sodium sulfite and acetone; the condensation product of water, casein, formaldehyde, sodium sulfite and acetone; the condensation product of casein, sodium sulfite, acetone, water, formaldehyde and sodium pyrosulfite; the condensation product of water, soy protein, formaldehyde, sodium sulfite and acetone; the condensation product of water, polyaspartic acid, acetaldehyde, sodium sulfite and pyrocatechol; the condensation product of dimethylsulfoxide, gelatin, glyoxal, urea and sodium sulfite; and the condensation product of water, polyaspartic acid, formaldehyde, sodium pyrosulfite, melamine and sodium hydroxide.

7. The method of claim 1 wherein the condensation product is the condensation product of water, gelatin, formaldehyde, sodium sulfite and acetone.

8. The method of claim 7 wherein the condensation product comprises 43.17% by weight water, 17.27% by weight gelatin, 25.18% by weight formaldehyde, 7.19% by weight sodium sulfite and 7.19% by weight acetone.

9. The method of claim 1 wherein the condensation product is the condensation product of water, casein, formaldehyde, sodium sulfite and acetone.

10. The method of claim 9 wherein the condensation product comprises 61.05% by weight water, 5.81% by weight casein, 23.26% by weight formaldehyde, 5.08% by weight sodium sulfite and 4.80% by weight acetone.

11. The method of claim 1 wherein the condensation product is the condensation product of casein, sodium sulfite, acetone, water, formaldehyde and sodium pyrosulfite.

12. The method of claim 11 wherein the condensation product comprises 26.90% by weight casein, 7.91% by weight sodium sulfite, 7.91% by weight acetone, 19.77% by weight water, 36.94% by weight formaldehyde and 0.57% by weight sodium pyrosulfite.

13. The method of claim 1 wherein the condensation product is the condensation product of water, soy protein, formaldehyde, sodium sulfite and acetone.

14. The method of claim 13 wherein the condensation product comprises 47.69% by weight water, 7.95% by weight soy protein, 8.27% by weight sodium sulfite, 7.79% by weight acetone, and 28.30% by weight formaldehyde.

15. The method of claim 1 wherein the condensation product is the condensation product of water, polyaspartic acid, acetaldehyde, sodium sulfite and pyrocatechol.

16. The method of claim 15 wherein the condensation product comprises 43.94% by weight water, 6.99% by weight polyaspartic acid, 17.96% by weight acetaldehyde, 34.80% by weight sodium sulfite and 36.00% by weight pyrocatechol.

17. The method of claim 1 wherein the condensation product is the condensation product of dimethylsulfoxide, gelatin, glyoxal, urea, and sodium sulfite.

18. The method of claim 17 wherein the condensation product comprises 57.75% by weight dimethylsulfoxide, 20.88% by weight gelatin, 3.62% by weight glyoxal, 8.61% by weight urea, and 17.40% by weight sodium sulfite.

19. The method of claim 1 wherein the condensation product is the condensation product of water, polyaspartic acid, formaldehyde, sodium pyrosulfite, melamine and sodium hydroxide.

20. The method of claim 19 wherein the condensation product comprises 39.55% by weight water, 9.88% by weight polyaspartic acid, 21.19% by weight formaldehyde, 7.06% by weight sodium pyrosulfite, 8.90% by weight melamine, and 13.42% by weight sodium hydroxide.

21. The method of claim 1 wherein the water soluble biodegradable fluid loss control additive comprises a condensation product in the range of from about 70% to about 90% by weight thereof and hydroxyethylcellulose having a molar substitution in the range of from about 1 mole to about 2.5 moles of ethylene oxide in the range of from about 10% to about 30% by weight thereof.

22. The method of claim 1 wherein the water soluble biodegradable fluid loss control additive comprises the condensation product of gelatin, formaldehyde, sodium sulfite and acetone in an amount of about 80% by weight thereof and hydroxyethylcellulose having a molar substitution of from about 1.5 moles of ethylene oxide in an amount of about 20% by weight thereof.

23. The method of claim 1 wherein the water soluble biodegradable fluid loss control additive is present in the cement composition in an amount in the range of from about 0.5% to about 2% by weight of cement therein.

24. The additive of claim 23 wherein the water soluble biodegradable fluid loss control additive comprises a condensation product in the range of from about 70% to about 90% by weight thereof and hydroxyethylcellulose having a molar substitution in the range of from about 1 mole to about 2.5 moles of ethylene oxide in the range of from about 10% to about 30% by weight thereof.

25. The additive of claim 23 wherein the water soluble biodegradable fluid loss control additive comprises the condensation product of gelatin, formaldehyde, sodium sulfite and acetone in an amount of about 80% by weight thereof and hydroxyethylcellulose having a molar substitution of from about 1.5 moles of ethylene oxide in an amount of about 20% by weight thereof.

26. The additive of claim 23 wherein the water soluble biodegradable fluid loss control additive is present in the cement composition in an amount in the range of from about 0.5% to about 2% by weight of cement therein.

27. A cement composition comprising:
a hydraulic cement;
sufficient water to form a slurry; and
a water soluble biodegradable fluid loss control additive comprising a mixture of a condensation product and hydroxyethylcellulose having a molar substitution in the range of from about 1 mole to about 2.5 moles of ethylene oxide.

28. The cement composition of claim 27 wherein the hydraulic cement in the cement composition is selected from the group consisting of Portland cements, slag cements, pozzolana cements, gypsum cements, aluminous cements and silica cements.

29. The cement composition of claim 27 wherein the hydraulic cement in the cement composition is Portland cement.

30. The cement composition of claim 27 wherein the water in the cement composition is selected from the group consisting of fresh water and salt water.

31. The cement composition of claim 27 wherein the water is present in the cement composition in an amount in the range of from about 35% to about 65% by weight of cement therein.

32. The cement composition of claim 27 wherein the condensation product is selected from the group consisting of the condensation product of water, gelatin, formaldehyde, sodium sulfite and acetone; the condensation product of water, casein, formaldehyde, sodium sulfite and acetone; the condensation product of casein, sodium sulfite, acetone, water, formaldehyde and sodium pyrosulfite; the condensation product of water, soy protein, formaldehyde, sodium sulfite and acetone; the condensation product of water, polyaspartic acid, acetaldehyde, sodium sulfite and pyrocatechol; the condensation product of dimethylsulfide, gelatin, glyoxal, urea and sodium sulfite; and the condensation product of water, polyaspartic acid, formaldehyde, sodium pyrosulfite, melamine and sodium hdyroxide.

33. The cement composition of claim 27 wherein the condensation product is the condensation product of water, gelatin, formaldehyde, sodium sulfite and acetone.

34. The cement composition of claim 27 wherein the condensation product comprises 43.17% by weight water, 17.27% by weight gelatin, 25.18% by weight formaldehyde, 7.19% by weight sodium sulfite and 7.19% by weight acetone.

35. The cement composition of claim 27 wherein the condensation product is the condensation product of water, casein, formaldehyde, sodium sulfite and acetone.

36. The cement composition of claim 35 wherein the condensation product comprises 61.05% by weight water, 5.81% by weight casein, 23.26% by weight formaldehyde, 5.08% by weight sodium sulfite and 4.80% by weight acetone.

37. The cement composition of claim 27 wherein the condensation product is the condensation product of casein, sodium sulfite, acetone, water, formaldehyde and sodium pyrosulfite.

38. The cement composition of claim 37 wherein the condensation product comprises 26.90% by weight casein, 7.91% by weight sodium sulfite, 7.91% by weight acetone, 19.77% by weight water, 36.94% by weight formaldehyde and 0.57% by weight sodium pyrosulfite.

39. The cement composition of claim 27 wherein the condensation product is the condensation product of water, soy protein, formaldehyde, sodium sulfite and acetone.

40. The cement composition of claim 39 wherein the condensation product comprises 47.69% by weight water, 7.95% by weight soy protein, 8.27% by weight sodium sulfite, 7.79% by weight acetone, and 28.30% by weight formaldehyde.

41. The cement composition of claim 27 wherein the condensation product is the condensation product of water, polyaspartic acid, acetaldehyde, sodium sulfite and pyrocatechol.

42. The cement composition of claim 41 wherein the condensation product comprises 43.94% by weight water, 6.99% by weight polyaspartic acid, 17.96% by weight acetaldehyde, 34.80% by weight sodium sulfite and 36.00% by weight pyrocatechol.

43. The cement composition of claim 27 wherein the condensation product is the condensation product of dimethylsulfoxide, gelatin, glyoxal, urea, and sodium sulfite.

44. The cement composition of claim 43 wherein the condensation product comprises 57.75% by weight dimethylsulfoxide, 20.88% by weight gelatin, 3.62% by weight glyoxal, 8.61% by weight urea, and 17.40% by weight sodium sulfite.

45. The cement composition of claim 27 wherein the condensation product is the condensation product of water, polyaspartic acid, formaldehyde, sodium pyrosulfite, melamine and sodium hydroxide.

46. The cement composition of claim 45 wherein the condensation product comprises 39.55% by weight water, 9.88% by weight polyaspartic acid, 21.19% by weight formaldehyde, 7.06% by weight sodium pyrosulfite, 8.90% by weight melamine, and 13.42% by weight sodium hydroxide.

47. The cement composition of claim 27 wherein the water soluble biodegradable fluid loss control additive comprises a condensation product in the range of from about 70% to about 90% by weight thereof and hydroxyethylcellulose having a molar substitution in the range of from about 1 mole to about 2.5 moles of ethylene oxide in the range of from about 10% to about 30% by weight thereof.

48. The cement composition of claim 27 wherein the water soluble biodegradable fluid loss control additive comprises the condensation product of gelatin, formaldehyde, sodium sulfite and acetone in an amount of about 80% by weight thereof and hydroxyethylcellulose having a molar substitution of from about 1.5 moles of ethylene oxide in an amount of about 20% by weight thereof.

49. The cement composition of claim 27 wherein the water soluble biodegradable fluid loss control additive is present in the cement composition in an amount in the range of from about 0.5% to about 2% by weight of cement therein.

50. A water soluble biodegradable fluid loss control additive comprising a mixture of a condensation product and hydroxyethylcellulose having a molar substitution in the range of from about 1 mole to about 2.5 moles of ethylene oxide.

51. The additive of claim 50 wherein the condensation product is selected from the group consisting of the condensation product of water, gelatin, formaldehyde, sodium sulfite and acetone; the condensation product of water, casein, formaldehyde, sodium sulfite and acetone; the condensation product of casein, sodium sulfite, acetone, water, formaldehyde and sodium pyrosulfite; the condensation product of water, soy protein, formaldehyde, sodium sulfite and acetone; the condensation product of water, polyaspartic acid, acetaldehyde, sodium sulfite and pyrocatechol; the condensation product of dimethylsulfide, gelatin, glyoxal, urea and sodium sulfite; and the condensation product of water, polyaspartic acid, formaldehyde, sodium pyrosulfite, melamine and sodium hydroxide.

52. The additive of claim 50 wherein the condensation product is the condensation product of water, gelatin, formaldehyde, sodium sulfite and acetone.

53. The additive of claim 50 wherein the condensation product comprises 43.17% by weight water, 17.27% by weight gelatin, 25.18% by weight formaldehyde, 7.19% by weight sodium sulfite and 7.19% by weight acetone.

54. The additive of claim 50 wherein the condensation product is the condensation product of water, casein, formaldehyde, sodium sulfite and acetone.

55. The additive of claim 54 wherein the condensation product comprises 61.05% by weight water, 5.81% by weight casein, 23.26% by weight formaldehyde, 5.08% by weight sodium sulfite and 4.80% by weight acetone.

56. The additive of claim 50 wherein the condensation product is the condensation product of casein, sodium sulfite, acetone, water, formaldehyde and sodium pyrosulfite.

57. The additive of claim 56 wherein the condensation product comprises 26.90% by weight casein, 7.91% by weight sodium sulfite, 7.91% by weight acetone, 19.77% by weight water, 36.94% by weight formaldehyde and 0.57% by weight sodium pyrosulfite.

58. The additive of claim 50 wherein the condensation product is the condensation product of water, soy protein, formaldehyde, sodium sulfite and acetone.

59. The additive of claim 58 wherein the condensation product comprises 47.69% by weight water, 7.95% by weight soy protein, 8.27% by weight sodium sulfite, 7.79% by weight acetone, and 28.30% by weight formaldehyde.

60. The additive of claim 50 wherein the condensation product is the condensation product of water, polyaspartic acid, acetaldehyde, sodium sulfite and pyrocatechol.

61. The additive of claim 60 wherein the condensation product comprises 43.94% by weight water, 6.99% by weight polyaspartic acid, 17.96% by weight acetaldehyde, 34.80% by weight sodium sulfite and 36.00% by weight pyrocatechol.

62. The additive of claim 50 wherein the condensation product is the condensation product of dimethylsulfoxide, gelatin, glyoxal, urea, and sodium sulfite.

63. The additive of claim 62 wherein the condensation product comprises 57.75% by weight dimethylsulfoxide, 20.88% by weight gelatin, 3.62% by weight glyoxal, 8.61% by weight urea, and 17.40% by weight sodium sulfite.

64. The additive of claim 50 wherein the condensation product is the condensation product of water, polyaspartic acid, formaldehyde, sodium pyrosulfite, melamine and sodium hydroxide.

65. The additive of claim 64 wherein the condensation product comprises 39.55% by weight water, 9.88% by weight polyaspartic acid, 21.19% by weight formaldehyde, 7.06% by weight sodium pyrosulfite, 8.90% by weight melamine, and 13.42% by weight sodium hydroxide.

\* \* \* \* \*